United States Patent

Iinuma

[19]

[11] Patent Number: 6,157,686
[45] Date of Patent: Dec. 5, 2000

[54] DIVERSITY APPARATUS WITH IMPROVED ABILITY OF REPRODUCING CARRIER WAVE IN SYNCHRONOUS DETECTION

[75] Inventor: Toshinori Iinuma, Anpachi-gun, Japan

[73] Assignee: Sanyo Electric Co., Ltd., Osaka, Japan

[21] Appl. No.: 09/051,919

[22] PCT Filed: Nov. 21, 1996

[86] PCT No.: PCT/JP96/03432

§ 371 Date: Aug. 11, 1998

§ 102(e) Date: Aug. 11, 1998

[87] PCT Pub. No.: WO97/19536

PCT Pub. Date: May 29, 1997

[30] Foreign Application Priority Data

Nov. 22, 1995 [JP] Japan ..................................... 7-304432

[51] Int. Cl.[7] .............................. H04L 1/02; H04L 27/30; H04B 7/00
[52] U.S. Cl. ........................ 375/347; 375/148; 455/277.1
[58] Field of Search ..................... 375/347, 264, 375/267, 280, 330, 331, 332, 349, 148; 455/273, 275, 277.1, 277.2, 278.1, 279.1; 329/304

[56] References Cited

U.S. PATENT DOCUMENTS 5,461,646 10/1995 Anvari ..................................... 375/347
5,901,187  5/1999 Iinuma ..................................... 375/347

*Primary Examiner*—Chi H. Pham
*Assistant Examiner*—Khai Tran
*Attorney, Agent, or Firm*—Arent Fox Kitner; Plotkin & Kahn PLLC

[57] ABSTRACT

The diversity apparatus of the present invention includes: the detecting unit for detecting reception phase data for each symbol from a reception signal based on a standard carrier wave reproduced from the reception signal; the combining unit for combining respectively a plurality of I-components and a plurality of Q-components in the reception phase data; and the demodulating unit for obtaining digital symbol data respectively from a piece of combined I-component and a piece of combined Q-component. The detecting unit reproduces the standard carrier wave from the reception signal by referring to the symbol data. This construction provides stable reproduction of carrier waves since the diversity apparatus reproduces the standard carrier waves by using the demodulation data which is obtained from the reception data after diversity combination.

7 Claims, 5 Drawing Sheets

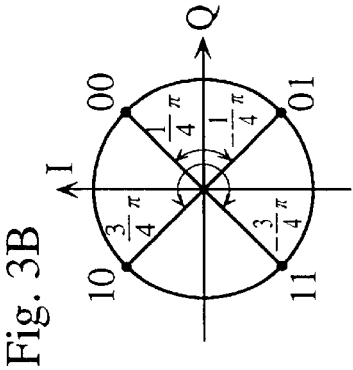
Fig. 3B
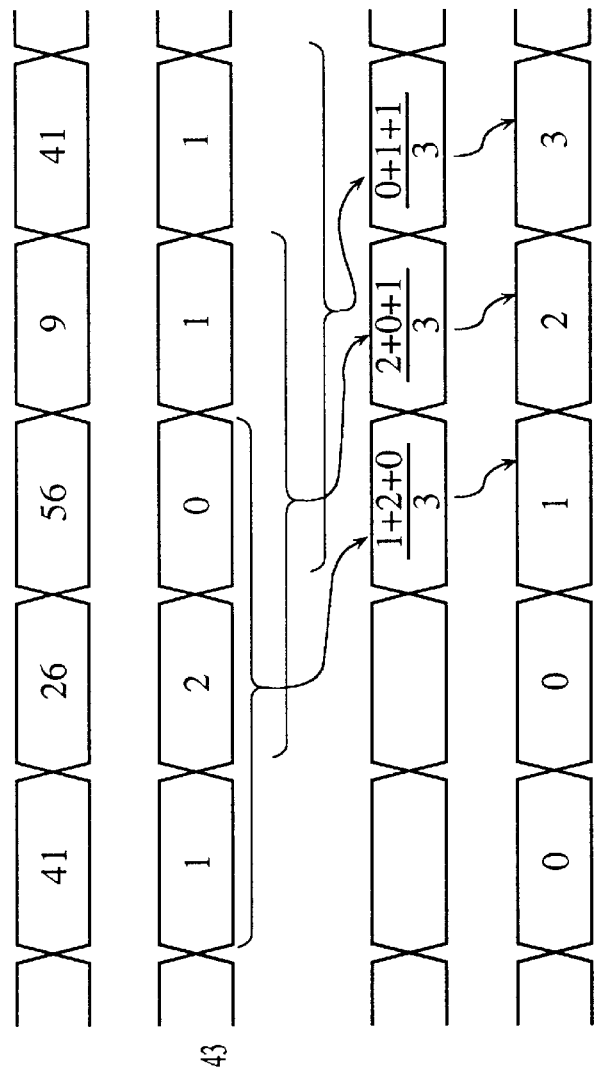
Fig. 3C
Fig. 3A

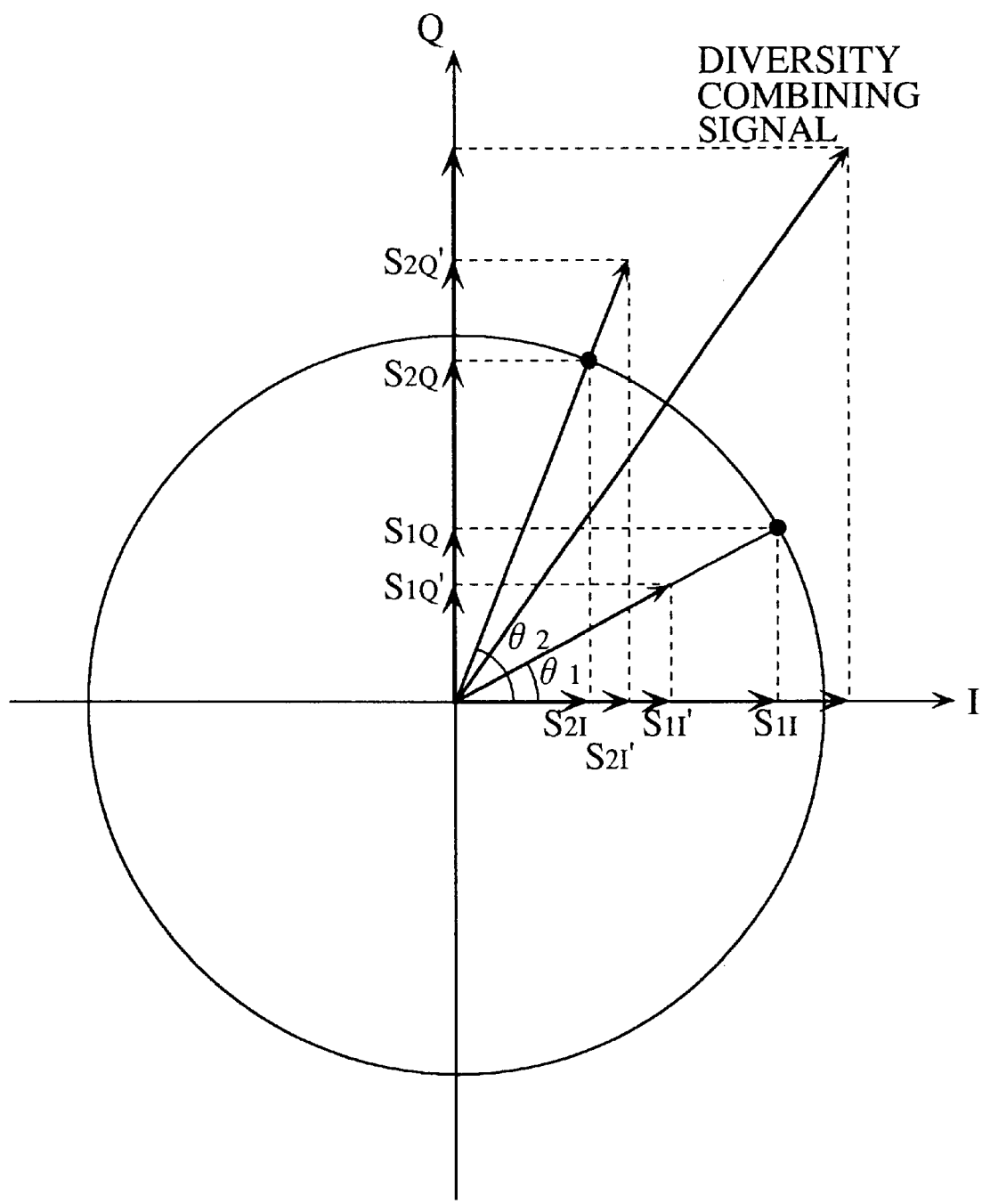

DIVERSITY APPARATUS WITH IMPROVED ABILITY OF REPRODUCING CARRIER WAVE IN SYNCHRONOUS DETECTION

BACKGROUND OF THE INVENTION (1) Field of the Invention

This invention relates to a diversity apparatus for performing a synchronous detection of a received signal by reproducing a carrier wave.

(2) Description of the Prior Art

Conventionally, digital communication apparatuses transmit information signals by modulating carrier-wave signals based on digital information signals (baseband signals) to achieve efficient transmission. There are such modulation methods as: Amplitude Shift Keying (ASK) for modulating the amplitude of the carrier-wave signal based on the digital baseband signal (modulating signal), Frequency Shift Keying (FSK) for modulating the frequency of the carrier-wave signal based on the modulating signal, Phase Shift Keying (PSK) for modulating the phase of the carrier-wave signal based on the modulating signal, and Quadrature Amplitude Moduration (QAM) for modulating the amplitude and phase of the carrier-wave signal based on the modulating signal.

There are such known methods for demodulating digital signals modulated by the above methods as the synchronous detection, the delay detection, and the frequency detection. Among these methods, the synchronous detection may gain the best receiving performance since the method reproduces the carrier wave from the received signal to demodulate the modulated signal.

In the synchronous detection, the method of reproducing the carrier wave is the most important factor in making demodulated signal since the performance depends on the ability of reproducing the carrier wave.

There are such methods of reproducing carrier waves as: the Costas method in which the frequency of the received signal is multiplied; the reverse modulation method in which demodulated results are returned as feedback; and the re-modulation method. The reverse modulation method and re-modulation method more have been put into practical use in non-fading line such as in satelite communications since these methods are able to reproduce the carrier wave even with low reception level compared to the Costas method.

It is well known in digital modulation methods that the reception performance, when applied to mobile communications and the like, deteriorates seriously due to the fading, a phenomenon in which reception level (RSSI: Received Signal Strength Indicator) changes seriously when affected by reflected or scattered electric waves branch.

The diversity reception, in which a plurality of receiving lines are used for reception, has been put into practice as an effective method to compensate for the reception level deterioration caused by the fading. It is therefore possible to improve the performance under fading by combining the diversity reception with the synchronous detection.

It is considered that conventional diversity apparatuses reproduce carrier waves for each receiving line in order to perform the diversity after the synchronous detection.

However, with such a construction diversity is performed after synchronous detection is performed for each receiving line, and the carrier wave reproduction cannot make the most of the improvement achieved with the diversity. That is, though the conventional construction of diversity apparatus has improved the reception sensitivity compared to an apparatus using only the synchronous detection, it still shows deteriorated reception performance when deterioration in Carrier/Noise (C/N) ratio of the received signal causes the deterioration in the carrier wave reproduction ability. Therefore, the carrier wave reproduction ability should be improved, especially for a case where a great number of receiving lines are combined. The more the number of combinations in diversity is, the apparatus is operated under worse C/N ratio.

The above problem has made it difficult to apply the synchronous detection to mobile communications and the like since the synchronous detection requires a stable reproduction of the carrier wave.

SUMMARY OF THE INVENTION

It is therefore an object of the present invention to provide a diversity apparatus with improved carrier wave reproduction ability.

A diversity apparatus for achieving the above object includes: a plurality of synchronous detecting means, each of which detects reception data from a reception signal based on a standard carrier wave reproduced from the reception signal; a combining means for combining a plurality pieces of reception data; and a demodulating means for obtaining demodulation data from a piece of combined reception data which is output from the combining means, wherein each of the plurality of synchronous detecting means reproduces the standard carrier wave from the reception signal by referring to the demodulation data.

With this construction, stable carrier wave reproduction is performed since demodulation data obtained after diversity combination from reception data is used to reproduce standard carrier wave. Also, data is received in better condition since the carrier wave can be reproduced even in a receiving line with poor C/N ratio. This enables a better diversity combination and increases the accuracy of data demodulation, and enables an application of the present invention to mobile communications which are susceptible to the fading.

Another diversity apparatus for achieving the above object includes: a plurality of synchronous detecting means, each of which detects an I-component and a Q-component of reception phase data for each symbol from a reception signal based on a standard carrier wave reproduced from the reception signal; a combining means for combining respectively a plurality of I-components and a plurality of Q-components in the reception phase data; and a demodulating means for obtaining digital symbol data respectively from a piece of combined I-component and a piece of combined Q-component, wherein each of the plurality of synchronous detecting means reproduces the standard carrier wave from the reception signal by referring to the symbol data.

With this construction, the same effect as that of the above apparatus is achieved in a diversity apparatus which detects with synchronous detection reception signals whose phase has been digitally modulated with QPSK and the like.

In the diversity apparatus, each of the plurality of synchronous detecting means may include: a carrier wave reproducing means for reproducing the standard carrier wave from the reception signal by using phase data corresponding to the symbol data demodulated by the demodulating means; a phase detecting means for detecting reception phase data from the reception signal by obtaining a difference between the standard carrier wave and the reception signal for each symbol; and a converting means for converting the reception phase data into I-component and Q-component.

In the diversity apparatus, the carrier wave reproducing means may include: a phase generating unit for generating the phase data corresponding to the symbol data demodulated by the demodulating means for each symbol; a subtracter for obtaining, for each symbol, a difference between the reception phase data and the phase data sent from the phase generating unit; a filter means for obtaining error data by smoothing the differences of a certain number of symbols; and a standard carrier wave generating unit for generating the standard carrier wave by generating a carrier wave signal and by correcting the carrier wave signal based on the error data.

In the diversity apparatus, the phase generating unit may include a table which outputs the phase data corresponding to the symbol data demodulated by the demodulating means, the symbol data being input as an address.

In the diversity apparatus, the phase generating unit may include a modulation circuit which modulates the standard carrier wave sent from the clock generating unit based on the symbol data demodulated by the demodulating means.

In the diversity apparatus, the subtracter may delay the reception phase data detected by the phase detecting means for synchronization, and obtains the difference between the reception phase data and the phase data sent from the phase generating unit.

BRIEF DESCRIPTION OF THE DRAWINGS

FIG. 3A is a time chart showing the operation timing of the carrier recover unit in the embodiment.

FIG. 3B shows correspondence between phase angles in IQ-coordinates and demodulation data in the embodiment.

FIG. 3C shows correspondence between phase angles and demodulation data in the embodiment.

FIG. 4 shows diversity combinations in IQ-coordinates in the embodiment.

DESCRIPTION OF THE PREFERRED EMBODIMENTS

Construction of Diversity Apparatus

Figure 1:
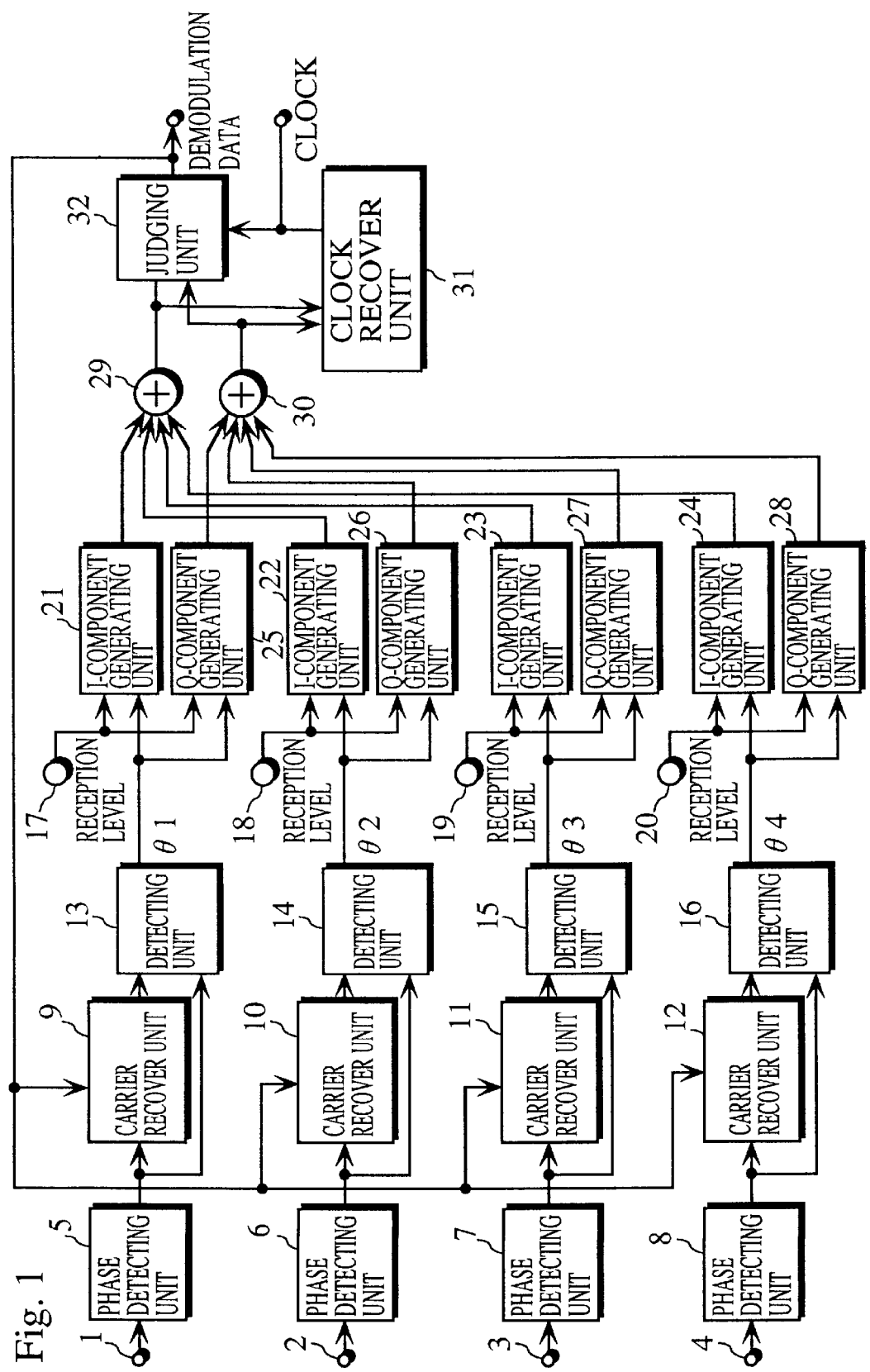
FIG. 1 is a block diagram illustrating the construction of the diversity apparatus in the embodiment of the present invention.

FIG. 1 is a block diagram illustrating the construction of the diversity apparatus in the embodiment of the present invention. As shown in the drawing, the present diversity apparatus includes input terminals 1–4, phase detecting units 5–8, carrier recover units 9–12, detecting units 13–16, input terminals 17–20, I-component generating units 21–24, Q-component generating units 25–28, adding unit 29, adding unit 30, clock recover unit 31, and judging unit 32. With this construction, the diversity apparatus allows the four receiving lines to perform simultaneously synchronous detection on a reception signal which is phase-modulated by Quadrature Phase Shift Keying (QPSK) and the like.

Input terminals 1–4, in FIG. 1, each are a terminal for receiving a signal.

Phase detecting units 5–8 detect reception phase data from the reception signal input through corresponding one of input terminals 1–4. This reception phase data is represented by a digital numeric value for a phase angle. For example, the reception phase data is represented by values 0–63 in decimal notation when the phase angle (−Π to Πrad) is divided into 64 stages.

Carrier recover units 9–12 reproduce the carrier wave component, which is included in the reception phase data, by using demodulation data from judging unit 32. The carrier wave component reproduced by the units is not analogue carrier wave signal, but is represented by a digital numeral representing the phase of the carrier wave as the reception phase data is.

Detecting units 13–16 detect phase data (hereinafter referred to as detection phase data) from the reception phase data and the reproduced carrier wave. More specifically, detecting units 13–16 detect the detection phase data by subtracting the reproduced carrier wave (phase of the carrier wave) from the reception phase data.

Input terminals 17–20 receive data representing the square of the received electric field strength sent from a circuit (not shown in the drawing) for detecting the level of the received electric wave.

I(Inphase)-component generating units 21–24 generate a result of multiplication of the sine of the detection phase data and the square of the electric field strength, namely, I-component of detection phase data weighted with the electric field strength. More specifically, by using a ROM prestoring a plurality of results of the above multiplication, weighted I-component is generated when the detection phase data and data representing the square of the strength of the electric field are input as addresses.

Q(Quadrature)-component generating units 25–28 generate a result of multiplication of the cosine of the detection phase data and the square of the electric field strength, namely, Q-component of detection phase data weighted with the electric field strength. More specifically, by using a ROM prestoring a plurality of results of the above multiplication, weighted Q-component is generated when the detection phase data and data representing the square of the strength of the electric field are input as addresses.

Adding unit 29 obtains a combined I-component by adding up the I-components generated by I-component generating units 21–24.

Adding unit 30 obtains a combined Q-component by adding up the Q-components generated by Q-component generating units 25–28.

Clock recover unit 31 generates a clock signal (hereinafter referred to as reproduction clock) which synchronizes with one symbol period, based on the combined I- and Q-components. For example, this is achieved by Phase Locked Loop (PLL) circuit.

Judging unit 32 make a judgement on binary symbol data (hereinafter referred to as demodulation data) for each symbol period by using the reproduction clock, based on the combined I- and Q-components.

Detailed Construction of Carrier Recover Unit

Figure 2:
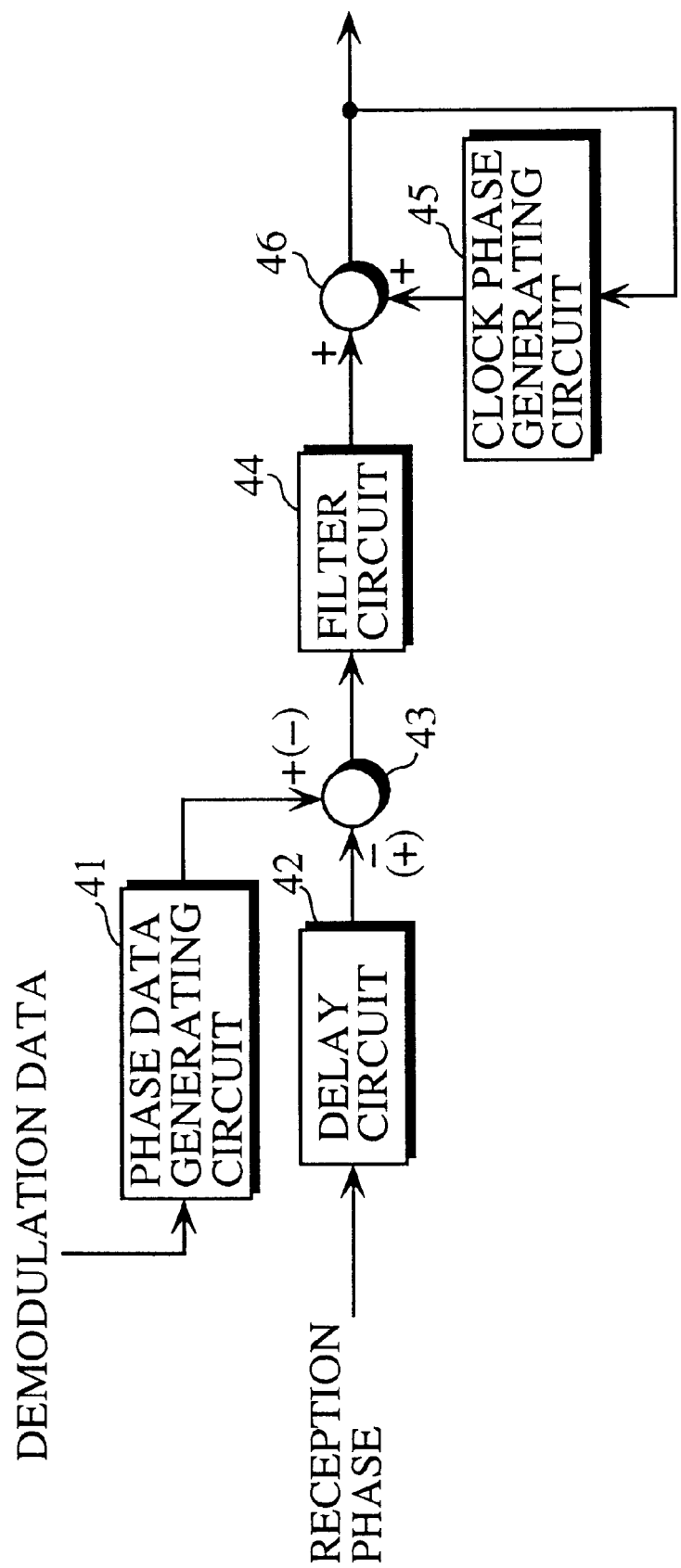
FIG. 2 is a block diagram illustrating the detailed circuit construction of the carrier recover unit in the embodiment.

FIG. 2 is a block diagram illustrating the detailed circuit construction of carrier recover unit 9. Carrier recover units 10–12 have the same construction.

As shown in the drawing, carrier recover unit 9 includes phase data generating circuit 41, delay circuit 42, subtracter 43, filter circuit 44, clock phase generating circuit 45, and adder 46. Carrier recover unit 9 reproduces a carrier wave using the demodulation data, that is, obtains a digital value representing the phase of the carrier wave. This construction is described below with reference to FIGS. 3A, 3B, and 3C.

Phase data generating circuit 41 receives the demodulation data output from judging unit 32, and generates modulation phase corresponding to the demodulation data. Here, the demodulation data for one symbol is two bits in case of QPSK. Therefore, it is supposed as shown in FIG. 3B, that two-bit demodulation data "00," "01," "10," and "11" are mapped as phase angles "Π/4," "−Π/4," "3Π/4," and "−3Π/4." Also, it is supposed, as shown in FIG. 3C, that phase angles −Π to Π are represented by digital values 0 to 63 in decimal notation. In this case, phase data generating circuit 41 outputs phase data corresponding to the demodulation data. That is, as shown in FIG. 3A, phase data generating circuit 41 outputs phase data "40," "24," "56," and "8" respectively corresponding to demodulation data "00," "01," "10," and "11."

Delay circuit 42, for example being comprised of a latch circuit for delaying one symbol period, delays reception phase data to synchronize the demodulation data with the reception phase data output from phase detecting unit 5 with the same symbol timing. As shown in FIG. 3A, the values for the demodulation data and the reception phase data do not match perfectly since a slight difference is generated between the clock output from clock phase generating circuit 45 and the carrier wave component of the received signal.

Subtracter 43 obtains a difference between the phase data output from phase data generating circuit 41 and the reception phase data output from delay circuit 42. This difference equals to the above difference between the clock output from clock phase generating circuit 45 and the carrier wave component of the received signal. The difference is obtained based on the final, reliable demodulation data by diversity. This indicates the accuracy has been improved.

Filter circuit 44 obtains error data by smoothing the phase difference data, that is, by obtaining the average of three symbols of phase difference data output from subtracter 43.

Clock phase generating circuit 45 internally generates a clock signal having the same frequency as that of the carrier wave component of the received signal, and outputs a digital value representing its phase. More specifically, clock phase generating circuit 45, being a PLL circuit which returns the phase of the carrier wave output from adder 46 as a feedback, outputs, for example as shown in FIG. 3A, a digital value corresponding to digital value "0" as a standard value (phase data of the carrier wave) representing "−Π" when phase angle "−Π" of the clock signal is the standard.

Adder 46 adds the smoothed phase difference data to the output from clock phase generating circuit 45. This allows the phase data of the carrier wave output from clock phase generating circuit 45 to be corrected by the phase difference data (error data) smoothed by filter circuit 44. This enables high-accuracy reproduction of carrier wave phases.

Operation

The operation of the diversity apparatus of the present embodiment with the above construction is described below.

FIG. 4 shows IQ-plane representing the combination process of the I- and Q-components independently obtained in a plurality of receiving lines. Note that this drawing shows only two receiving lines including detecting units 13 and 14 for the sake of convenience.

Detection phase data θ1 and θ2 respectively detected by detecting units 13 and 14 represent only the phase of the received signal. Consequently, detection phase data θ1 and θ2 may be represented as points (vectors) on the unit circle on the IQ-plane.

Images S1I and S2I, which indicate respectively detection phase data θ1 and θ2 reflected on I-axis, are represented by Formulae (1.1), (1.2); images S1Q and S2Q, which also indicate respectively detection phase data θ1 and θ2 reflected on Q-axis, are represented by Formulae (2.1), (2.2).

$S1I = \cos θ1$      Formula (1.1)

$S2I = \cos θ2$      Formula (1.2)

$S1Q = \sin θ1$      Formula (2.1)

$S2Q = \sin θ2$      Formula (2.2)

The following formulae represent weighting the above vector components with the square of reception data levels R1 and R2.

$S1I' = R_1^2 * S1I$      Formula (3.1)

$S2I' = R_2^2 * S2I$      Formula (3.2)

$S1Q' = R_1^2 * S1Q$      Formula (4.1)

$S2Q' = R_2^2 * S2Q$      Formula (4.2)

Here, weighting components (I,Q) are obtained uniquely from detection phase data θ and reception level data R by the following formulae.

$I = R^2 * COS\ θ$      Formula (5.1)

$Q = R^2 * SIN\ θ$      Formula (5.2)

The results of the above Formulae are respectively generated by I-component generating unit and Q-component generating unit. I-component generating unit and Q-component generating unit are achieved by memories such as ROMs which prestore calculation results of (I,Q) corresponding to addresses, the addresses being the detection phase data and reception level data. On receiving these addresses, I-component generating unit and Q-component generating unit output stored data.

The weighted I-component and Q-component are respectively added up, namely combined, by adders 29 and 30. The combined I-component and Q-component are the diversity combining signals, and are represented by the following Formulae.

$I\text{-component} = S1I' + S2I'$      Formula (6.1)

$Q\text{-component} = S1Q' + S2Q'$      Formula (6.2)

Though the above Formulae show components of only two receiving lines, components of all the receiving lines (four components in FIG. 1) are added up in reality.

Clock generating unit 31 extracts a clock component which is included in the diversity combining signal, that is, extracts a reproduction clock which synchronizes with the symbol period. Judging unit 32 judges the digital symbol data corresponding to the diversity combining signal. The judgement result is output, as demodulation data, to a latter-stage circuit (outside the drawing) of the diversity apparatus and is provided for carrier recover units 9–12.

Carrier recover units 9–12, as has been described earlier, reproduce carrier waves based on the demodulation data by the diversity combination signal, namely, the demodulation data reflecting the improvement by the diversity. This is described as follows.

In the carrier recover unit shown in FIG. 2, when receiving demodulation data (digital symbol data for each symbol), phase data generating circuit 41 generates phase data (data of the first and second rows in FIG. 3A) corresponding to the demodulation data. The carrier recover unit obtains a difference (data in the fourth row of FIG. 3A) between the generated phase data and the reception phase data (data in the third row of FIG. 3A) in the same symbol period delayed by delay circuit 42. The difference of three symbols is smoothed by filter circuit 44 and is output as error data (data in the fifth row of FIG. 3A)

Clock phase generating circuit 45 generates carrier wave phase data which has not been corrected. This carrier wave phase data is output to detecting unit 13 as a standard carrier wave (data in the sixth row of FIG. 3A) after being corrected based on the error data by adder 46.

In this way, the standard carrier wave is corrected based on the error data obtained from the demodulation data. This provides accurate reproductions.

Figure 5:
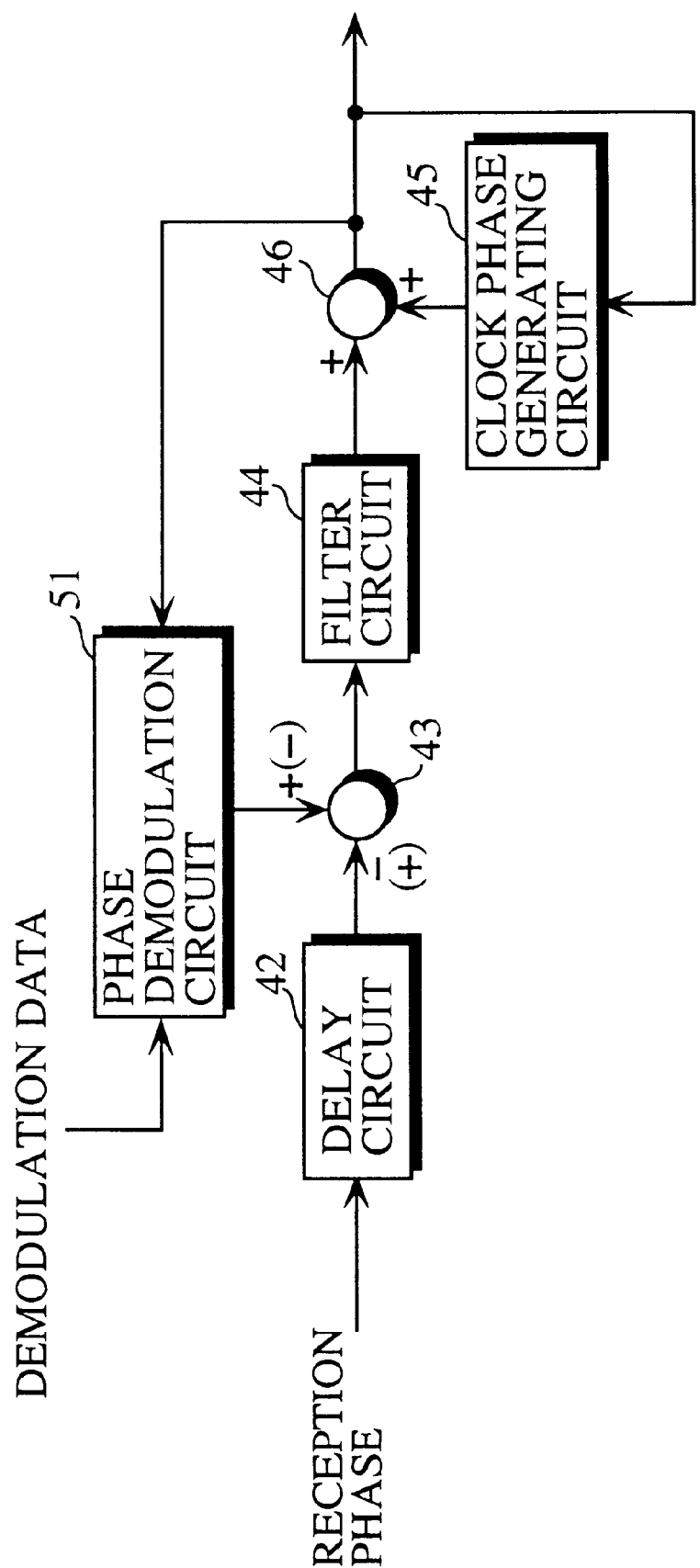
FIG. 5 is a block diagram illustrating another construction of the carrier recover unit in the embodiment.

Another circuit construction of carrier recover units 9–12 are shown in FIG. 5. The carrier recover unit in the drawing includes phase demodulating circuit 51 instead of phase data generating circuit 41 shown in FIG. 2. The following description is of the construction not yet described.

Phase demodulating circuit 51 re-modulates the standard carrier wave based on the demodulation data when it receives reproduced standard carrier wave and demodulation data (as data to be modulated). An adder may be used as phase demodulating circuit 51 since the re-modulation result may be obtained by adding phase being equal to the demodulation data to the carrier wave signal.

In this embodiment, the diversity apparatus has four receiving lines. However, any number of receiving lines may be used. In such a case, adders 29 and 30 add up the same number of inputs as that of the receiving lines.

In this embodiment, the reception signal is modulated with QPSK modulation. However, another modulation method may be used as far as it performs synchronous detection of receiving lines.

In this embodiment, 64 levels of phase data corresponding to the phase angles are used as shown in FIG. 3C. However, other numbers of levels may be used as well. Also, a different kind of relationship between the phase angles and the phase data may be adopted.

It is apparent from the above description that the diversity apparatus of the present invention provides stable reproduction of carrier waves even under poor communication environments such as fading. As a result, it is possible to apply synchronous detection to mobile communications and the like which have been difficult to apply.

INDUSTRIAL USE POSSIBILITY

It is apparent from the above description that the diversity apparatus of the present invention is useful as a diversity apparatus since this apparatus, including a plurality of receiving lines for performing synchronous detection on reception signals, reproduces carrier waves for synchronous detection for each receiving line. This diversity apparatus is specifically suitable for an environment in which receiving lines have a poor C/N ratio affected by fading and the like.

What is claimed is:

1. A diversity apparatus comprising:
   a plurality of synchronous detecting means, each of which detects reception data from a reception signal based on a standard carrier wave reproduced from the reception signal;
   a combining means for combining a plurality pieces of reception data; and
   a demodulating means for obtaining demodulation data from a piece of combined reception data which is output from the combining means, wherein
   each of the plurality of synchronous detecting means reproduces the standard carrier wave from the reception signal by referring to the demodulation data.

2. A diversity apparatus comprising:
   a plurality of synchronous detecting means, each of which detects an I-component and a Q-component of reception phase data for each symbol from a reception signal based on a standard carrier wave reproduced from the reception signal;
   a combining means for combining respectively a plurality of I-components and a plurality of Q-components in the reception phase data; and
   a demodulating means for obtaining digital symbol data respectively from a piece of combined I-component and a piece of combined Q-component, wherein
   each of the plurality of synchronous detecting means reproduces the standard carrier wave from the reception signal by referring to the symbol data.

3. The diversity apparatus of claim 2, wherein each of the plurality of synchronous detecting means comprises:
   a carrier wave reproducing means for reproducing the standard carrier wave from the reception signal by using phase data corresponding to the symbol data demodulated by the demodulating means;
   a phase detecting means for detecting reception phase data from the reception signal by obtaining a difference between the standard carrier wave and the reception signal for each symbol; and
   a converting means for converting the reception phase data into I-component and Q-component.

4. The diversity apparatus of claim 3, wherein the carrier wave reproducing means comprises:
   a phase generating unit for generating the phase data corresponding to the symbol data demodulated by the demodulating means for each symbol;
   a subtracter for obtaining, for each symbol, a difference between the reception phase data and the phase data sent from the phase generating unit;
   a filter means for obtaining error data by smoothing the differences of a certain number of symbols; and
   a standard carrier wave generating unit for generating the standard carrier wave by generating a carrier wave signal and by correcting the carrier wave signal based on the error data.

5. The diversity apparatus of claim 4, wherein
   the phase generating unit includes a table which outputs the phase data corresponding to the symbol data demodulated by the demodulating means, the symbol data being input as an address.

6. The diversity apparatus of claim 4, wherein
   the phase generating unit includes a modulation circuit which modulates the standard carrier wave sent from the clock generating unit based on the symbol data demodulated by the demodulating means.

7. The diversity apparatus of claim 4, wherein the subtracter delays the reception phase data detected by the phase detecting means for synchronization, and obtains the difference between the reception phase data and the phase data sent from the phase generating unit.

* * * * *